United States Patent [19]

Fiorell et al.

[11] Patent Number: 5,988,965

[45] Date of Patent: Nov. 23, 1999

[54] LOCKING FASTENER

[75] Inventors: Kenneth J. Fiorell, Huntington Beach; Rahmat F. Toosky, Laguna Niguel, both of Calif.

[73] Assignee: McDonnell Douglas Corporation, Huntington Beach, Calif.

[21] Appl. No.: 08/882,590

[22] Filed: Jun. 25, 1997

[51] Int. Cl.⁶ .................................................. F16B 39/34
[52] U.S. Cl. ...................... 411/303; 411/324; 411/314; 411/369
[58] Field of Search ...................................... 411/302, 303, 411/324, 369, 370, 542, 313, 314, 534

[56] References Cited

U.S. PATENT DOCUMENTS

| | | |
|---|---|---|
| 234,967 | 11/1880 | Courtenay . |
| 244,256 | 7/1881 | Kendall . |
| 267,862 | 11/1882 | Fletcher . |
| 531,245 | 12/1894 | Anderson . |
| 2,360,531 | 10/1944 | Wojtan . |
| 2,365,380 | 12/1944 | Bloomfield . |
| 2,502,642 | 5/1950 | Currlin . |
| 2,752,814 | 7/1956 | Iaia . |
| 2,872,961 | 2/1959 | Mills . |
| 3,040,796 | 6/1962 | Gouverneur, II . |
| 3,203,459 | 8/1965 | Coldren . |
| 3,399,589 | 9/1968 | Breed . |
| 3,520,342 | 7/1970 | Scheffer . |
| 3,572,414 | 3/1971 | Onufer . |
| 3,635,272 | 1/1972 | Scheffer . |
| 3,797,547 | 3/1974 | Shinjo . |
| 4,004,626 | 1/1977 | Biblin . |
| 4,019,550 | 4/1977 | DeHaitre . |
| 4,378,187 | 3/1983 | Fullerton . |
| 5,454,675 | 10/1995 | DeHaitre . |

*Primary Examiner*—Flemming Saether
*Attorney, Agent, or Firm*—Senniger, Powers, Leavitt & Roedel

[57] ABSTRACT

A quick-operating locking fastener assembly for use in connecting members together, the fastener assembly comprising a fastener having a threaded shank, and a lock nut assembly receivable on the shank. The lock nut assembly includes a retainer having a passage for receiving the shank, and a seat formed in the retainer. An insert is held in the passage and has internal threads formed thereon for mating with threads of the shank. The insert is radially contractible and expandable between an engaged position in which the insert is threadably engaged with the shank and a disengaged position in which the insert is free to move axially along the shank without engagement of the insert with the shank. A generally deformable lock is disposed in the seat of the retainer and is sized and shaped such that the lock is not in contact with the threads of the shank when the lock is in an undeformed condition so that the lock nut assembly may be rapidly slid onto the shank to a location in which the nut assembly is ready to be tightened to a locked position by relative rotation of the lock nut assembly and fastener with the insert in its engaged position. The lock is deformed upon engagement with one of the members and tightening of the lock nut assembly into locking engagement with the shank thereby to lock the lock nut assembly in place on the fastener.

5 Claims, 5 Drawing Sheets

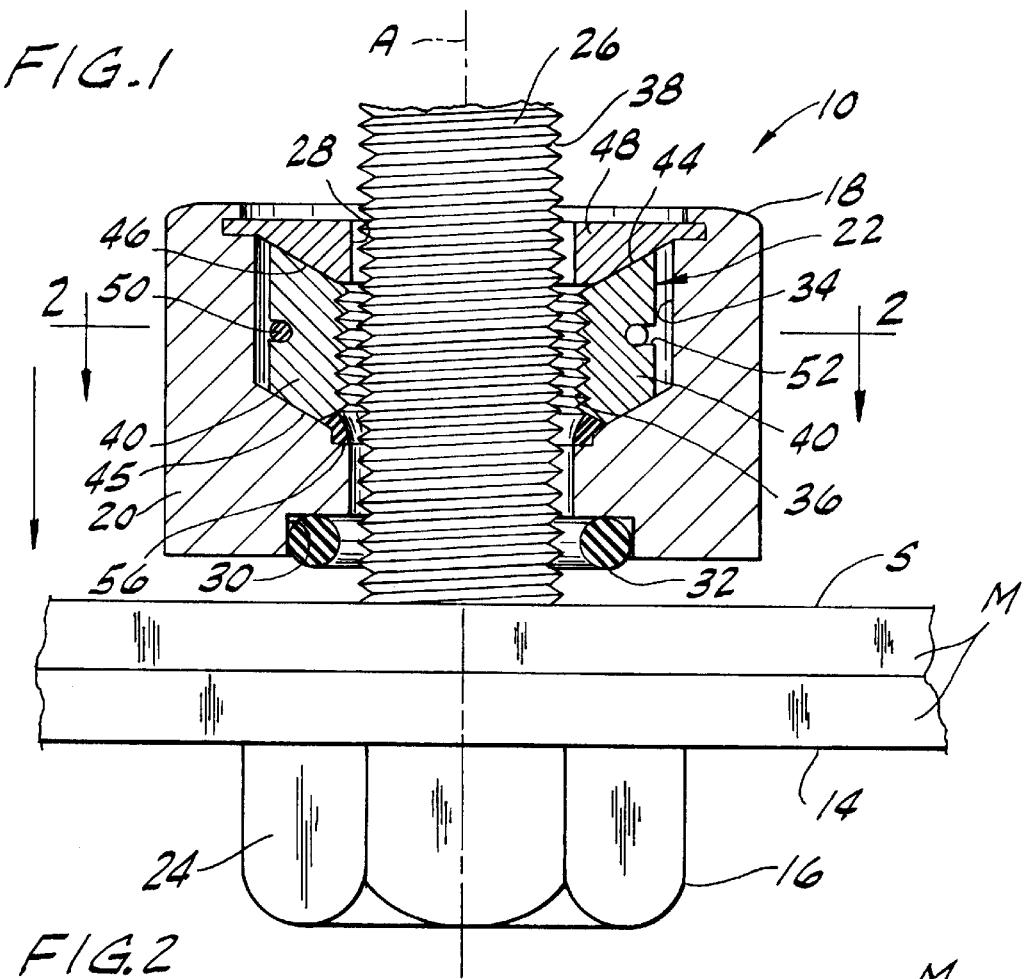
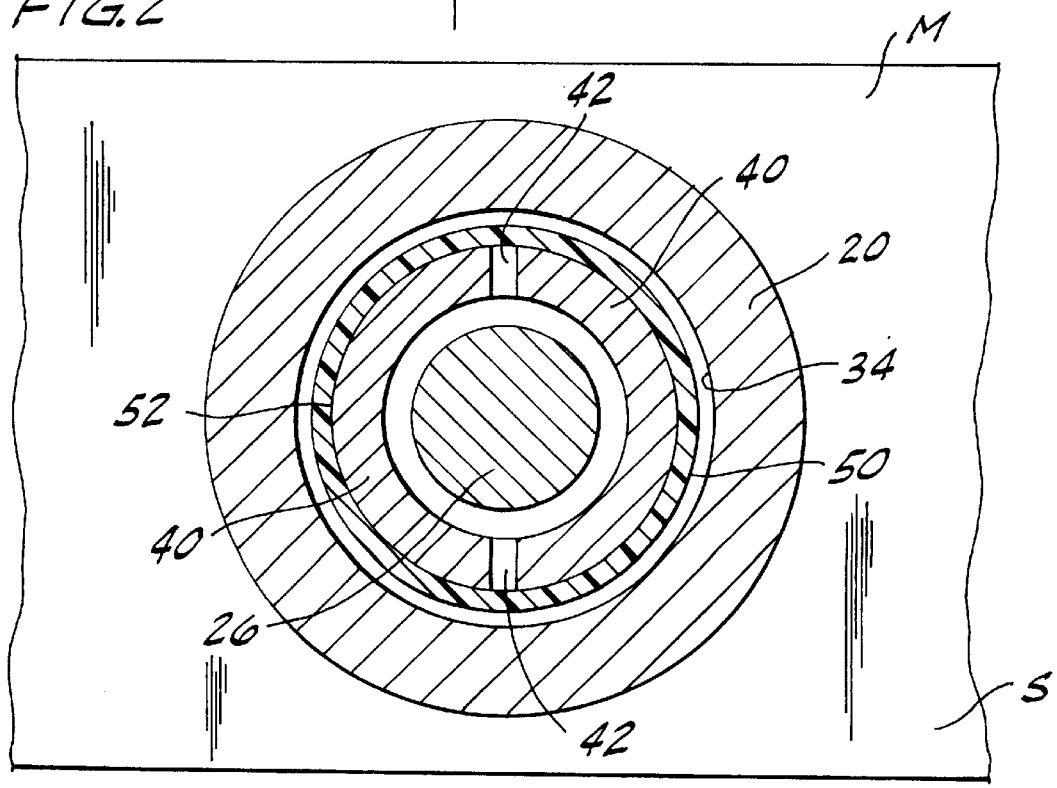

LOCKING FASTENER

BACKGROUND OF THE INVENTION

This invention relates generally to fasteners and, more particularly, to a fastener with a locking feature.

Fasteners which are used to connect structural members together in critical applications often require a locking feature to prevent the fastener from becoming loose, or the structural members from becoming separated. A locking feature is typically required where the fastener is subject to vibration, cyclic motions, or other environmental effects. A locking feature is also used for applications in which an accurate preload is required to maintain joint integrity, eliminate gaps between joined members, and increase the life of the fastener and structural members. Loosening of the fastener is not only a problem due to possible detachment of the structural members, but on vehicles such as spacecraft or aircraft, loose parts of the fastener and associated components may cause a hazard by interfering with the operation of equipment.

One such fastener having a locking feature comprises a bolt and a nut having a groove formed in one end for receiving a sealing insert. The sealing insert is internally threaded for mating with a threaded shank of the bolt. The forming of threads on the soft material of the sealing insert and matching of the threads on the insert with internal threads formed on the metal portion of the nut typically require manufacturing techniques which are time consuming and expensive. Another type of locking nut includes a sealing insert having a smooth inner diameter formed without threads. The threads are instead formed in the insert upon the first application of the nut on the shank. The insert is not as effective during subsequent installations as during its initial use.

Moreover, if the groove for receiving the sealing insert is formed in the head or a load carrying portion of the nut, the strength of the fastener is significantly reduced. The addition of material to the fastener to increase its strength increases the weight and cost of the fastener.

In addition to the drawbacks discussed above, these fasteners all require the nut to be threaded over the entire length of the threaded shank of the bolt which requires significant installation time for bolts having large diameter or long length threads.

Rapid-assembly nuts (commonly referred to as "Zip-Nuts") reduce installation time by allowing the nut to slide axially onto the bolt until seated against a base. An example of a rapid-assembly nut is described in U.S. Pat. No. 4,378,187. These nuts are advantageous where long travel is required to seat the nut. The threaded nut can be quickly positioned on a threaded bolt by application of translational force to position the nut along the bolt. Once the nut is seated, the internal threads of the nut engage the external threads of the shank of the bolt so that the nut may be torqued to its tightened position. The design of the rapid-assembly nut, however, is not conducive to common locking features such as applying adhesives, lacquer, or special sealants to the mating threads of the nut and bolt, since the sealant leaves residue on the internal surfaces of the nut and may have adverse effects on subsequent usage and functionality of the assembly. Furthermore, these sealants impact torque tension relationships which make it difficult to determine tension in the bolt by application of a torque wrench.

SUMMARY OF THE INVENTION

The present invention overcomes the deficiencies of the prior art by providing a nut and bolt fastener for connecting members together and having a locking feature deformable upon contact with one of the members for full engagement with threads of the bolt for preventing the nut and bolt from becoming loose. Among the features of the present invention may be noted the provision of a fastener which has a compact construction which is lightweight and economical to manufacture. The fastener is reusable, and reliable after repeated use since the locking feature does not engage the threads of the bolt during installation. The locking fastener overcomes the limitations of the prior art devices by providing a locking fastener which can be easily and quickly installed and securely retains the nut on the bolt against the structural members.

Generally, a quick-operating locking fastener assembly of the present invention may be used to connect members together and comprises a fastener having a head and an externally threaded shank extending therefrom and a lock nut assembly receivable on the shank. The lock nut assembly includes a retainer having a passage extending generally longitudinally therethrough for receiving the threaded shank of the fastener, and a seat formed in one end of the retainer. The passage includes a chamber portion for holding an insert having internal threads formed thereon for mating with the external threads of the shank. The insert is radially contractible and expandable between an engaged position in which the internal threads of the insert are threadably engaged with the external threads of the shank and a disengaged position in which the insert is free to move axially along the length of the shank without engagement of the internal threads of the insert with the external threads of the shank. Generally deformable locking means is disposed in the seat of the retainer and is sized and shaped such that the locking means is not in contact with the threads of the shank and at least a portion of the locking means protrudes outwardly from the retainer when the locking means is in an undeformed condition so that the lock nut assembly may be rapidly, translationally slid onto the fastener shank from a free end of the shank to a location nearer the head in which the lock nut assembly is ready to be tightened to a locked position by relative rotation of the lock nut assembly and fastener with the insert in its engaged position. The locking means is deformed upon engagement with one of the members and tightening of the lock nut assembly into locking engagement with the shank thereby to lock the lock nut assembly in place on the fastener.

In another aspect of the invention, a lock nut assembly is for use with a fastener as described above. The lock nut assembly comprises a body having a passage extending generally longitudinally therethrough for receiving the shank of the fastener. A seat is formed in one end of the body for receiving a composite lock. The composite lock comprises a generally deformable member and a cam. The lock is sized and shaped such that the lock is not in contact with the threads of the shank and at least a portion of the lock protrudes outwardly from the body when the composite lock is in an undeformed condition. The composite lock is deformed upon engagement with one of the structural members and tightening of the lock assembly into locking engagement with the shank thereby to lock the lock nut assembly in place on the fastener.

Other objects and features will be in part apparent and in part pointed out hereinafter.

BRIEF DESCRIPTION OF THE DRAWINGS

FIG. 1 is a fragmentary partial cross-sectional view of a looking fastener assembly of the present invention in an unlocked position;

FIG. 2 is a cross-sectional view taken in the plane including line 2—2 of FIG. 1;

Corresponding reference characters indicate corresponding parts throughout the several views of the drawings.

DESCRIPTION OF THE PREFERRED EMBODIMENTS

Figure 3:
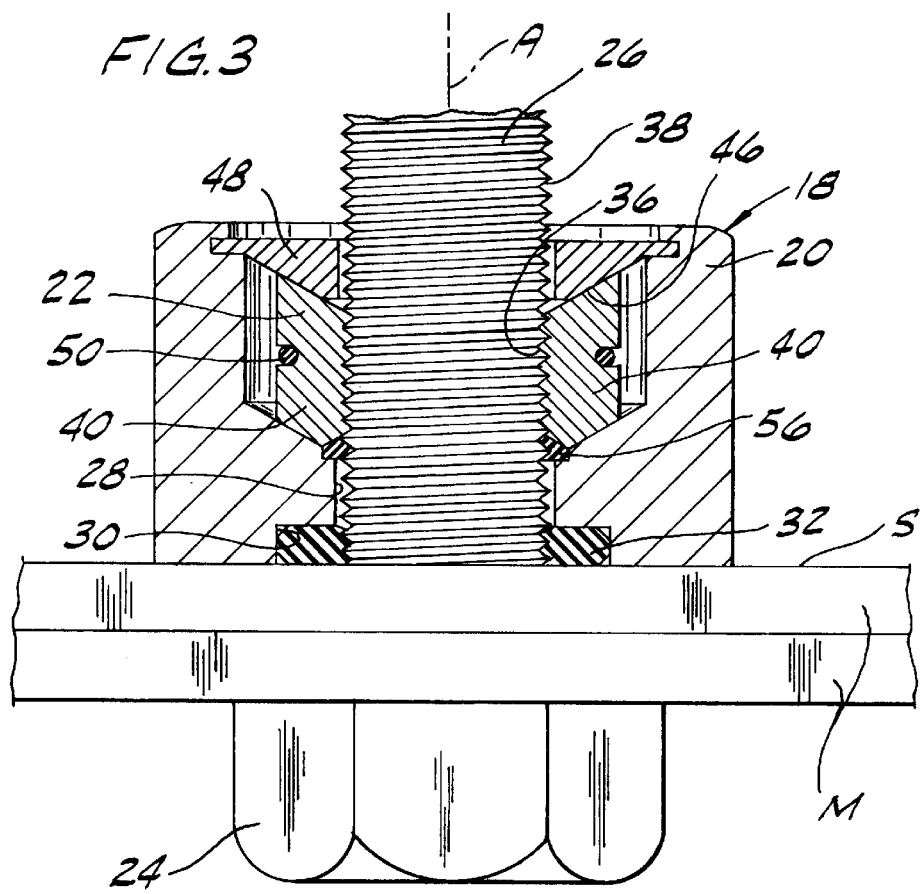
FIG. 3 is a fragmentary partial cross-sectional view of the locking fastener assembly of FIG. 1 in a locked position.

Referring now to the drawings, and first to FIG. 1, a quick-operating locking fastener assembly of the present invention is generally indicated at 10. The fastener assembly is for use in attaching two members M such as a panel and a structural frame member or a component and a structural member or joining more than two members together. Each of the members M has an outer surface S for engagement with opposing portions of the fastener assembly 10 for clamping the two members together. The fastener assembly 10 comprises a fastener such as a bolt 16 and a lock nut assembly, generally indicated at 18, having a retainer 20 and an insert, generally indicated at 22.

The bolt 16 has a head 24 and an externally threaded shank 26 extending therefrom. The bolt 16 is preferably formed from a metal alloy having strength, corrosion resistance, and other characteristics required for the specific application. The diameter of the shank 26 and pitch of the threads should be selected to meet the applicable strength requirements for the bolt 16.

The lock nut assembly 18 is receivable on the shank 26 and includes the retainer 20 having a passage 28 extending generally longitudinally therethrough for receiving the shank of the fastener. The outer surface of the retainer 20 has a polygonal surface, such as double hexagonal, for application of a wrench. The retainer 20 is preferably integrally formed as one piece from a metal alloy, polymeric material, or other suitable material. A seat 30 is formed in one end of the retainer for receiving a lock in the form of a ring 32, which will be further described below. The seat 30 is generally cylindrical shaped. A chamber portion 34 is formed in the passageway 28 for receiving the insert 22. The insert 22 is held in the chamber portion 34 of the passage 28 and has internal threads 36 formed thereon for mating with the external threads 38 of the shank 26.

The insert 22 is radially contractible and expandable between an engaged position (FIG. 3) in which the internal threads 36 of the insert 22 are threadably engaged with the external threads 38 of the shank 26 and a disengaged position (FIG. 1) in which the insert 22 is free to move axially along the length of the shank without engagement of the internal threads of the insert with the external threads of the shank.

The insert 22 comprises two insert pieces 40 separated by an axial gap 42 (FIG. 2) to allow the pieces to move in a radial direction relative to a central longitudinal axis A of the shank 26. More than two insert pieces 40 may be used to form the insert 22. Each insert piece 40 has an inclined surface 44 at one end for mating with a camming surface 46 of a cap 48 which is fixedly held within the retainer 20, and an inclined surface 45 at the opposite end, which is generally parallel to inclined surface 44 (FIG. 1).

A spring 50 is positioned in a groove 52 extending circumferentially around the insert pieces 40. The spring 50 biases the insert pieces 40 radially inward toward the central longitudinal axis A of the shank 26 into a position engaging the internal threads 36 of the insert 22 with the external threads 38 of the shank. As the insert 22 is moved along the threaded shank 26 of the bolt 16, in the direction indicated by arrow $A_1$ in FIG. 1, the threads 38 of the shank 26 contact the threads 36 of the insert pieces 40 and through a ratcheting action force the insert pieces upward against the camming surface 46 of the cap 48 and outwardly, disengaging the threads of the insert from the threads of the bolt. This enables the lock nut assembly 18 to be quickly moved to a final position near the head 24 of the bolt 16 adjacent the members M to be joined. The arrangement of the inclined surfaces 44, 45 of the insert pieces 40 with the retainer 20 permit the insert pieces 40 to move radially outward upon engagement of the threads 38 of the shank 26 with the threads 36 of the insert as the lock nut assembly 18 is moved in the direction indicated by arrow $A_1$, but does not permit the insert pieces to move radially outward as the lock nut assembly is moved in the opposite direction for removal of the lock nut assembly from the bolt.

When the retainer is in a stationary position relative to the bolt 16, the spring 50 forces the insert pieces radially inward and the internal threads 38 of the insert 22 engage the external threads 38 of the shank 26 (FIG. 3). Rotation of the lock nut assembly 18 further pulls the insert pieces 40 downward and along the camming surface 46 of the cap 48, tightening the threaded inner surface of the insert 22 against the threads 38 of the shank 26 and compressing a rubber elastic stop washer 56. The stop washer 56 is deformed into the threads 38 of the shank 26 but provides minimal locking force since the size of the washer is limited by the length of the retainer 20 and the force applied to the washer is limited by the spring force exerted on the insert pieces 40 by the spring 50 as the insert 22 is moved radially inward. Thus, the locking force of the washer 56 is limited if the lock nut assembly 18 is to remain lightweight and compact.

It is to be understood that other types of rapid-assembly nuts may be used without departing from the scope of this invention.

Referring again to FIG. 1, the generally deformable lock ring 32 (broadly "locking means") is disposed in the seat 30 of the retainer 20. The lock ring 32 is sized and shaped such that the lock ring is not in contact with the threads 38 of the shank 26 when in an undeformed condition so that the lock nut assembly 18 may be rapidly, translationally slid onto the shank of the bolt 16 from a free end of the shank to a location nearer the head 24. The lock ring 32 is deformable upon engagement with the outer surface S of one of the members M being joined together and tightening of the lock nut assembly 18 into locking engagement with the shank 26 thereby to lock the lock nut assembly in place on the bolt 16 (FIG. 3). A portion of the lock ring 32 protrudes outwardly from the retainer 20 when the lock ring 32 is in its undeformed condition (FIG. 1) so that when the lock ring is deformed it completely fills the seat 30 and fully engages the threads 38 of the shank 26 to grip the shank and securely lock the lock nut assembly 18 in place. Since the lock ring 32 protrudes outwardly beyond the retainer 20 the size of the lock ring is not limited by the length of the retainer. The engagement of the lock ring 32 with the outer surface S of the member M allows torque applied to the retainer 20 to be applied to the lock to force the lock into engagement with the threads 38 of the shank 26, thus providing a strong locking action between the lock nut assembly 18 and bolt 16.

The lock ring 32 has an inside diameter greater than the diameter of the threads 38 on the shank 26 when the lock ring is in its undeformed condition so that the lock nut assembly 18 is free to move axially along the shank. The lock ring 32 has a generally round cross-section, but may have other cross-sectional shapes such as square. The lock ring 32 preferably has a cross-sectional height which is approximately the same as the cross-sectional width of the lock ring. The diameter of the lock ring 32 is greater than the height of the seat 30 so that upon contact of the retainer 20 with the outer surface S of the member M, the lock ring 32 is deformed to engage the threads 38 of the shank 26. The lock ring 32 may be formed from a standard O-ring made from an elastomeric material such as rubber, plastic, nylon or any other suitable material. The material preferably has high friction and dampening characteristics to absorb vibrational forces which tend to loosen the lock nut assembly 18 and damage the bolt 16 and lock nut assembly.

Figure 4:
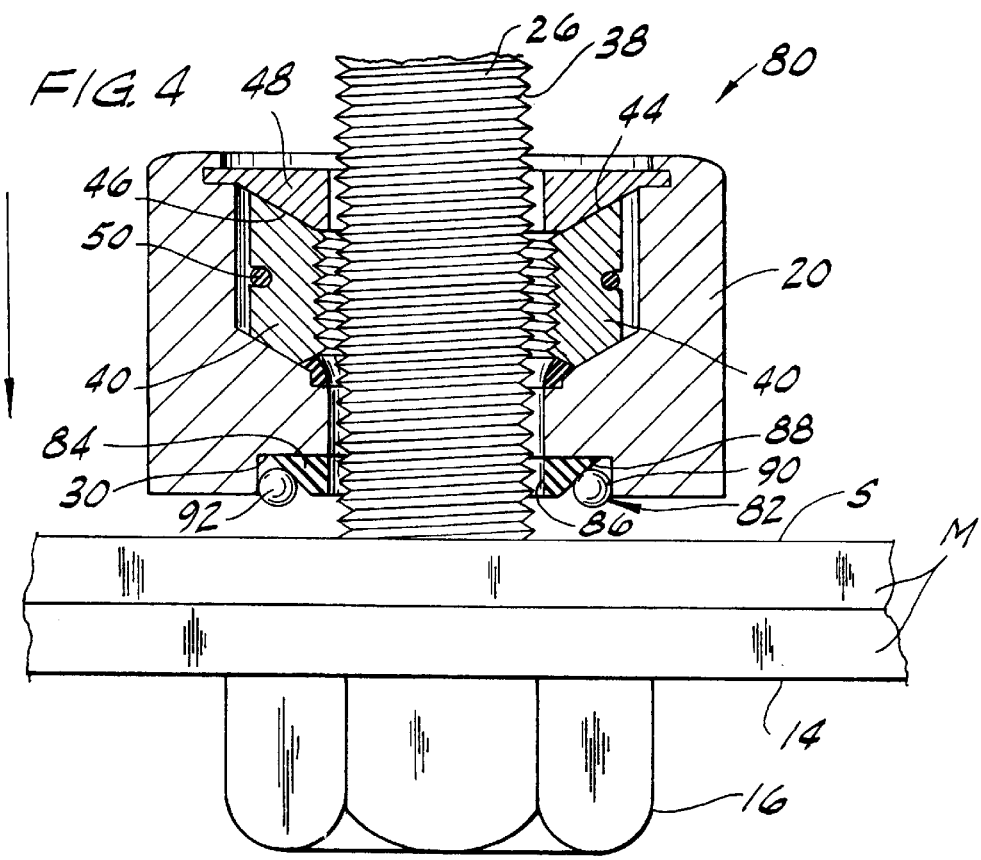
FIG. 4 is a fragmentary partial cross-sectional view of a locking fastener assembly of a second embodiment of the present invention in an unlocked position.
Figure 5:
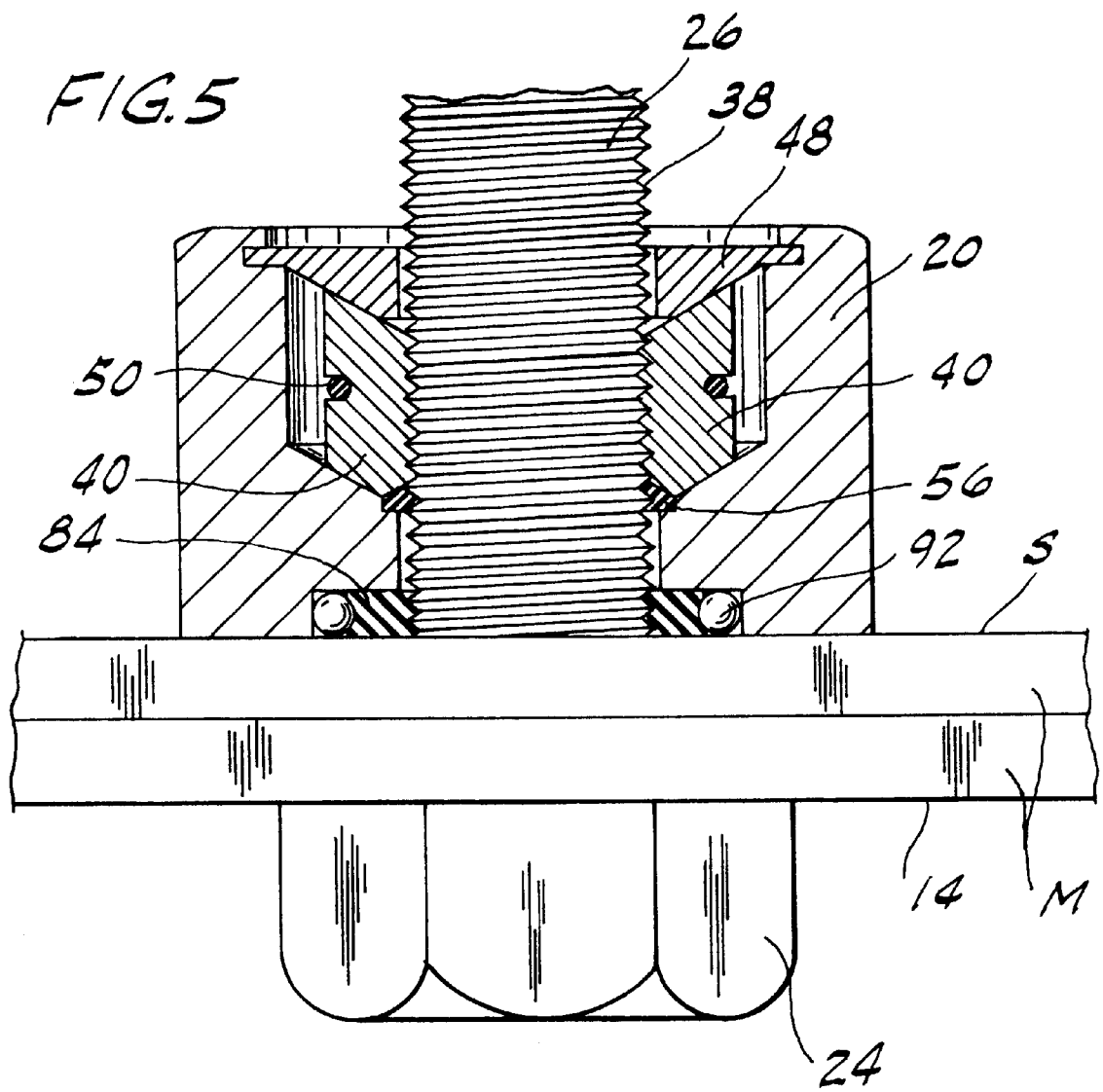
FIG. 5 is a fragmentary partial cross-sectional view of the locking fastener assembly of FIG. 4 in a locked position.

A locking fastener assembly of a second embodiment of the present invention is shown in FIGS. 4 and 5 and generally indicated at 80. A composite lock, generally indicated at 82, comprises a deformable ring 84 having a generally flat inner surface 86 for contacting the threads 38 of the shank 26 and a tapered outer surface 88 for engagement with a cam in the form of three balls 90 (only two are shown) located within the seat 30 for forcing the ring into engagement with the threads of the shank when the fastener assembly is in its locked position. The balls 90 are movable generally axially along the tapered outer surface 88 of the ring 84. The balls 90 may also be held in place by a retainer or by the ring 84 as described below. The balls 90 may be formed from plastic, metal or any other suitable material which is compatible with the material of the ring 84 and the retainer 20. The cam may have other configurations such as a continuous ring, or a plurality of different shaped camming members, for example. The cam is preferably formed from a generally rigid material such as a metal alloy or a polymeric material. In the second embodiment, the ring 84 and cam (balls 90) constitute "locking means."

Figure 6:
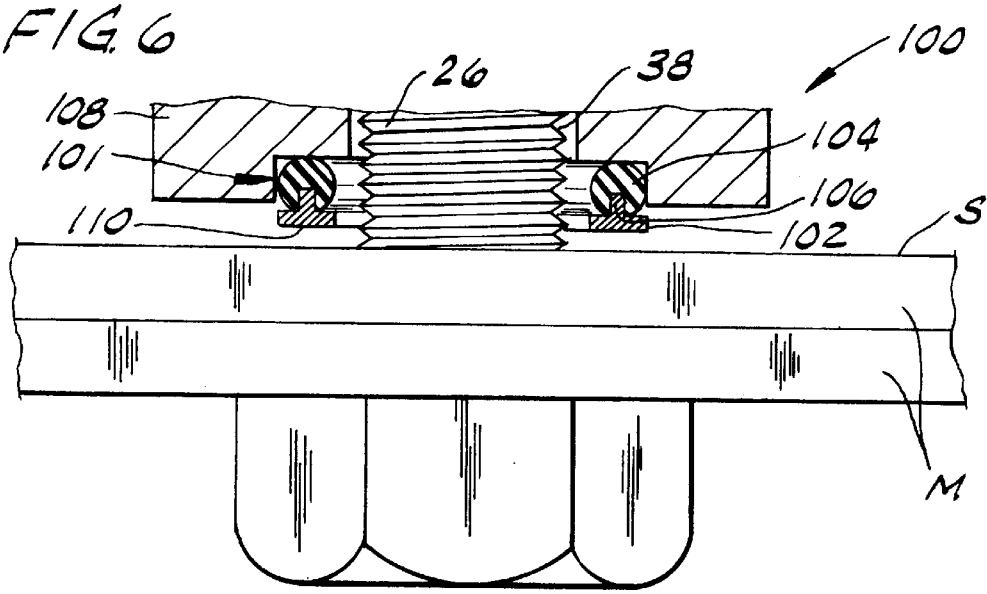
FIG. 6 is a fragmentary partial cross-sectional view of a locking fastener assembly of a third embodiment of the present invention.

A third embodiment of the locking fastener is shown in FIG. 6 and generally indicated at 100. A composite lock, generally indicated at 101, comprises a cam 102 and a generally deformable ring 104 having a generally round cross-section and a notch 106 formed therein for receiving a portion of the cam. The cam 102 is a ring with a generally T-shaped cross-section having a generally flat bottom 110 for engagement with the surface S of one of the members M. The cam 102 may be molded or bonded to the ring 104, for example. As the body 108 comes into contact with the outer surface S of the member M, the cam 102 deforms the ring 104 which completely fills the seat and engages the threads 38 of the shank 26 to grip the shank and securely lock the lock nut assembly in place. The cross-sectional configurations of the cam 102 and ring 104 may be other than those shown without departing from the scope of the invention.

Figure 7:
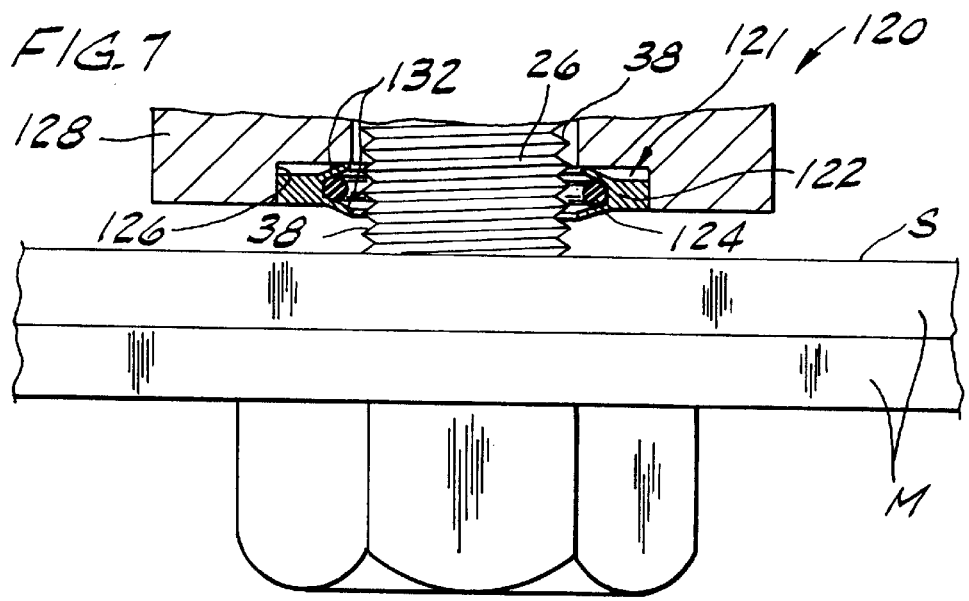
FIG. 7 is a fragmentary partial cross-sectional view of a locking fastener assembly of a fourth embodiment of the present invention.

FIG. 7 shows a fourth embodiment of the locking fastener of the present invention, generally indicated at 120. The fastener 120 includes a composite lock, generally indicated at 121, comprising a cam 122 and an O-ring 124. The cam 122 has a generally C-shaped cross-section and is sized for receiving the O-ring 124. The outer diameter of the cam 122 is preferably sized to have an interference fit with a seat 126 of a body 128 of the lock nut assembly. The cam 122 may also be held in place by a suitable adhesive, for example. A lip (not shown) may be formed on a lower portion of the seat 126 so that the lock may be snapped into the seat. A lower portion of the seat 126 may also be swaged over a portion of the lock after it is inserted into the seat to retain the lock within the seat.

Figure 7A:
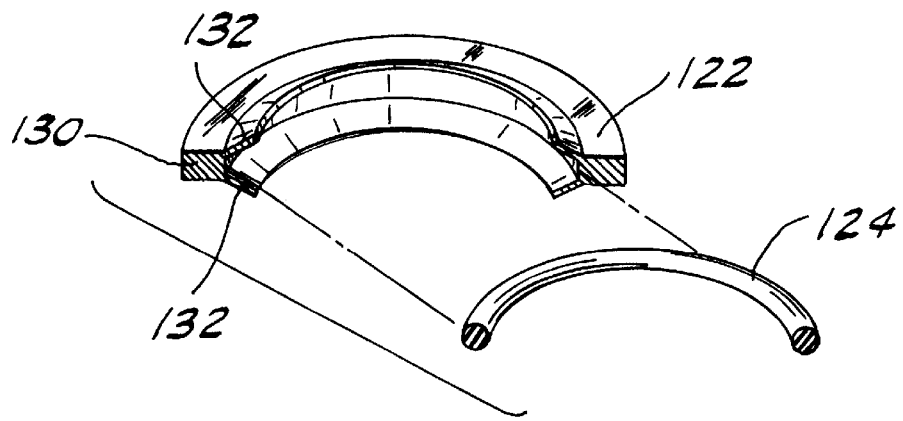
FIG. 7A is a perspective exploded view of a lock of the locking fastener assembly of FIG. 7.

As shown in FIG. 7A, the cam 122 comprises an outer portion 130 having a generally rectangular cross-section and two inwardly directed flanges 132. The flanges 132 hold the O-ring 124 in place so that the lock 121 can be easily inserted into the seat 126 of the body 128 as a one-piece assembly (FIG. 7). The flanges 132 are preferably deformable so that they compress the O-ring 124 as the lower flange contacts the outer surface S of the member M and the O-ring engages the threads 38 of the shank 26 to securely lock the lock nut assembly in place. The flanges 132 also prevent damage to the O-ring 124 by eliminating contact between the O-ring and the member M and the body 128 of the lock nut assembly. When the lock nut assembly is moved away from the member M, the O-ring 124 returns to its undeformed condition and pushes the flanges 132 away from one another so that the O-ring is no longer in contact with the threads 38 of the shank 26 to prevent damage to the O-ring during removal or installation of the lock nut assembly on the bolt. It is to be understood that the ring 124 may have other cross-sectional configurations, such as rectangular, for example.

Figure 8:
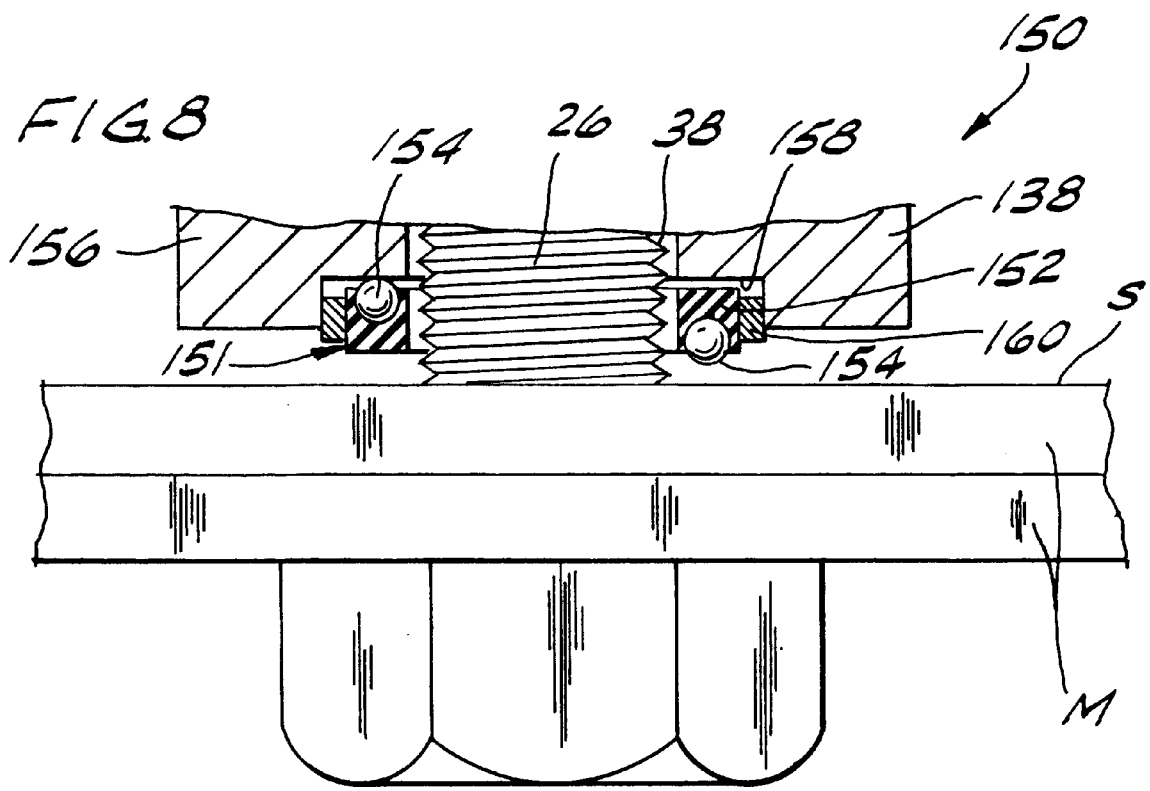
FIG. 8 is a fragmentary partial cross-sectional view of a locking fastener assembly of a fifth embodiment of the present invention.
Figure 8A:
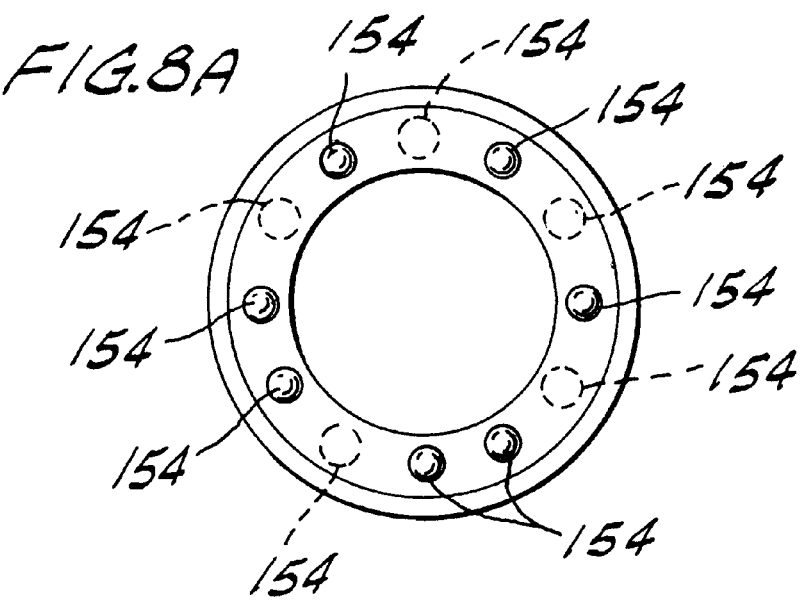
FIG. 8A is a top view of a lock of the locking fastener assembly of FIG. 8.

A fifth embodiment of the locking fastener assembly is shown in FIG. 8, and generally indicated at 150. A lock, generally indicated at 151, comprises a generally deformable ring 152 having balls ("cams") 154 molded therein. The balls 154 are preferably evenly spaced circumferentially around the ring (FIG. 8A) and located adjacent either an upper or lower surface of the ring for contact with a seat 158 of a body 156 of the lock nut assembly, or the outer surface S of the member M (FIG. 8). The lock 151 protrudes outwardly beyond the body 156 so that when the lock contacts the surface S, the ring 152 is deformed and the balls 154 force the ring into contact with the threads 38 of the shank 26 to grip the bolt and securely lock the lock nut assembly in place. The balls 154 are preferably formed from a rigid material such as metal or a polymeric material. It is to be understood that the cams 154 may be formed from various materials including plastic and may have shapes other than spherical without departing from the scope of this invention. The deformable ring 152 may be formed from rubber, nylon or other deformable material and may have a cross-sectional shape other than the one shown.

An outer ring 160 is preferably interposed between the seat 158 and the lock 151 to securely hold the lock in place within the seat. The outer ring 160 may be molded or bonded to the deformable ring 152 and formed from a metal or plastic material, for example. The outer ring 160 may be retained in the seat 158 by a lip (not shown) or other retention device described above.

It is to be understood that any of the locks 32, 82, 101, 121, 151 described above may be used with a single piece nut having a passageway extending generally longitudinally through a body of the nut for receiving the shank 26 of the fastener, and a seat formed in one end of the body for receiving the lock. The nut may be constructed without the radially contractible and expandable insert.

It will be observed from the foregoing that the quick-operating locking fastener assembly 10, 80, 100, 120, 150 of this invention has numerous advantages. Importantly, the deformable lock 32, 82, 101, 121, 151 provides dampening characteristics for absorbing vibrational forces which tend to loosen the lock nut assembly. The fastener assembly 10, 80, 100, 120, 150 provides for consistent and repeated usage since the lock only contacts the threads during tightening of the lock nut assembly and is not subject to damage by the threads 38 of the shank 26 as the lock nut assembly is moved translationally along the length of the shank. The lock 32, 82, 101, 121,, 151 also does not impact torque tension relationships so that a torque wrench may be used to determine the tension in the bolt 16. Furthermore, the deformable lock 32, 82, 101, 121, 151 allows the lock nut assembly to freely move rapidly along the length of the shank 26 for initial assembly of the fastener while providing a strong locking engagement with the threads 38 of the shank upon tightening of the lock nut assembly. The fastener assembly 10, 80, 100, 120, 150 is relatively lightweight, compact, inexpensive to manufacture and easy to use.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A quick-operating locking fastener assembly for use in connecting members together, the fastener assembly comprising:

a fastener having a head and an externally threaded shank extending therefrom and a lock nut assembly receivable on the shank, the lock nut assembly including a retainer having a passage extending generally longitudinally therethrough for receiving the shank of the fastener, and a seat formed in one end of the retainer, the passage including a chamber portion;

an insert held in the chamber portion of the passage and having internal threads formed thereon for mating with the external threads of the shank, the insert being radially contractible and expandable between an engaged position in which the internal threads of the insert are threadably engaged with the external threads of the shank and a disengaged position in which the insert is free to move axially along the length of the shank without engagement of the internal threads of the insert with the external threads of the shank; and generally deformable locking means disposed in the seat of the retainer, said locking means being sized and shaped such that said locking means is not in contact with the threads of the shank and at least a portion of said locking means protrudes outwardly from the retainer when said locking means is in an undeformed condition so that the lock nut assembly may be rapidly, translationally slid onto the fastener shank from a free end of the shank to a location nearer the head in which the lock nut assembly is ready to be tightened to a locked position by relative rotation of the lock nut assembly and fastener with the insert in its engaged position;

said locking means adapted to be deformed upon engagement with one of the members and tightening of the lock nut assembly into locking engagement with the shank thereby to lock the lock nut assembly in place on the fastener;

wherein said locking means comprises a ring made of an elastomeric material and at least one cam located within the seat for forcing the ring into engagement with the threads of the shank when the fastener assembly is in its locked position; and wherein the cam comprises a ball and wherein the ring has a tapered outer surface for engagement with the ball.

2. A locking fastener assembly as set forth in claim 1 wherein the ball protrudes outwardly from one end of the retainer.

3. A locking fastener assembly as set forth in claim 2 further comprising plural balls.

4. A quick-operating locking fastener assembly comprising:

a fastener having a head and an externally threaded shank extending therefrom and a lock nut assembly receivable on the shank, the lock nut assembly including a retainer having a passage extending generally longitudinally therethrough for receiving the shank of the fastener, and a seat formed in one end of the retainer, the passage including a chamber portion;

an insert held in the chamber portion of the passage and having internal threads formed thereon for mating with the external threads of the shank, the insert being radially contractible and expandable between an engaged position in which the internal threads of the insert are threadably engaged with the external threads of the shank and a disengaged position in which the insert is free to move axially along the length of the shank without engagement of the internal threads of the insert with the external threads of the shank; and a generally deformable lock comprising a ring and a cam disposed in the seat of the retainer, the ring being sized and shaped such that the ring is not in contact with the threads of the shank and at least a portion of the lock protrudes outwardly from the retainer when the lock is in an undeformed condition so that the lock nut assembly may be rapidly, translationally slid onto the fastener shank from a free end of the shank to a location nearer the head in which the lock nut assembly is ready to be tightened to a locked position by relative rotation of the lock nut assembly and fastener with the insert in its engaged position;

the ring adapted to be deformed upon tightening of the lock nut assembly into locking engagement with the shank thereby to lock the lock nut assembly in place on the fastener; and wherein the cam comprises a ball and wherein the ring has a tapered outer surface for engagement with the ball.

5. A locking fastener assembly as set forth in claim 4 wherein the ball protrudes outwardly from one end of the retainer.

* * * * *